E. J. DAY.
LINE FASTENER.
APPLICATION FILED OCT. 8, 1912.
1,092,563.
Patented Apr. 7, 1914.
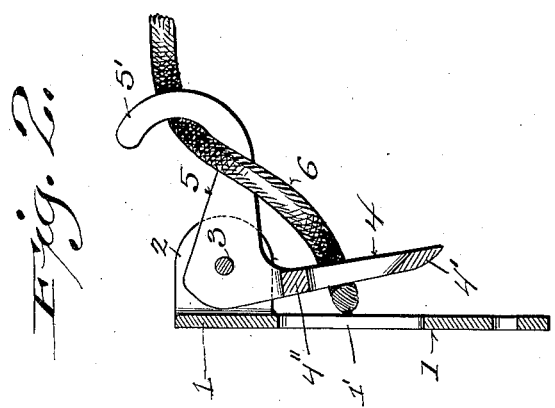
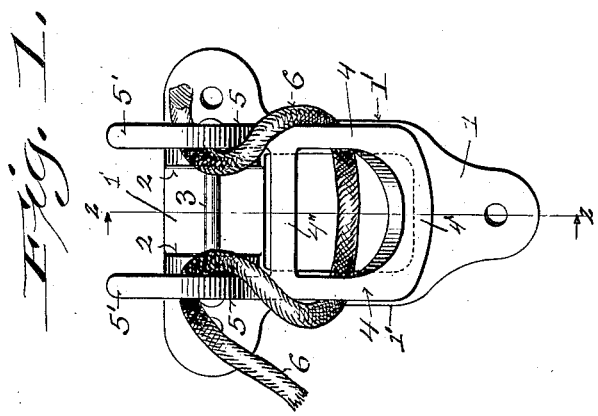

UNITED STATES PATENT OFFICE.

EDWARD J. DAY, OF MILWAUKEE, WISCONSIN, ASSIGNOR OF ONE-FOURTH TO WALTER J. BAUER, OF MILWAUKEE, WISCONSIN.

LINE-FASTENER.

1,092,563. Specification of Letters Patent. Patented Apr. 7, 1914.

Application filed October 8, 1912. Serial No. 724,568.

*To all whom it may concern:*

Be it known that I, EDWARD J. DAY, a citizen of the United States, and resident of Milwaukee, in the county of Milwaukee and State of Wisconsin, have invented certain new and useful Improvements in Line-Fasteners; and I do hereby declare that the following is a full, clear, and exact description thereof.

My invention has for its object to provide a simple, economical and effective line fastener, the said invention consisting in certain peculiarities of construction and combination of parts as hereinafter set forth with reference to the accompanying drawings and subsequently claimed.

In the drawings Figure 1 represents a plan view of a line fastener embodying the features of my invention, the same being shown with the end of a line arranged thereabout, and Fig. 2, a central sectional elevation of the same, the section being indicated by line 2—2 of Fig. 1.

Referring by characters to the drawings, 1 represents a fixed jaw member in the form of a flat skeleton plate for attachment to any convenient point of anchorage, the base of the same being cut away to form a pair of parallel fixed biting members 1'. Projecting from the face of the skeleton plate adjacent to one end is a pair of apertured lugs 2 for the reception of a pintle 3, upon which pintle is hingedly mounted a second skeleton plate having a pair of parallel biting members 4, which biting members are cross-connected at their ends by a mouthpiece 4' and an intermediate base-bar 4''. The biting members 4 have apertured arms 5 extending therefrom, which arms straddle the lugs 2, the arm apertures serving as means for engaging the pintle whereby a hinged connection is effected between the two skeleton plates that constitute articulating jaw-members having double biting faces.

The arms 5 are provided with hooked terminals 5', which terminals are arranged to receive a line 6, one end of the line being shown looped thereabout, the said arms in conjunction with their connected pair of biting members 4 forming a bell-crank lever. In order to secure the line an end of the same is looped over the hooked terminals 5' of one arm and from thence said line is looped downwardly and between the pair of fixed and movable biting members 1', 4', respectively, the loose end of the line being brought up and over the hooked terminal of the second arm, from which point said loose end of the line depends. By coiling the line as stated above it is apparent that the greater the strain placed thereon, the tighter the same will be gripped between the double pair of biting members, due to the lever action of the bell-cranks, whereby the biting power will be exerted upon said line at two points between the gripping faces thereof. Hence it will be seen that the line is tightly gripped at two points between the faces of the pairs of biting members, whereby a firm grip is assured and the wear incidental to chewing the line at a single point is materially reduced.

I claim:

A line fastener comprising a flat plate constituting a jaw member having ears extending therefrom adjacent to one end, a pair of fixed parallel biting members formed in the base, a second jaw member in hinge connection with the ears of the first named jaw member, a pair of hooked arms extending from the base of the second connection with the ears of the first named jaw member, the same being adapted to receive the end of a line that is looped between said jaw members, a pair of movable parallel biting members extending from the base of the hooked arms adapted to co-act with the fixed biting members for gripping the line, a mouthpiece connecting the last mentioned set of biting members at their ends, and an intermediate base-bar connecting said biting members at an intermediate point.

In testimony that I claim the foregoing I have hereunto set my hand at Milwaukee in the county of Milwaukee and State of Wisconsin in the presence of two witnesses.

EDWARD J. DAY.

Witnesses:
RAYMOND LEE DAY,
LORENZ F. WAGNER.

Copies of this patent may be obtained for five cents each, by addressing the "Commissioner of Patents, Washington, D. C."